United States Patent
Marissen et al.

(10) Patent No.: US 10,663,265 B2
(45) Date of Patent: May 26, 2020

(54) MATERIAL SHEET AND PROCESS FOR ITS PREPARATION

(71) Applicant: DSM IP ASSETS B.V., Heerlen (NL)

(72) Inventors: Roelof Marissen, Born (NL); Reinard Jozef Maria Steeman, Elsloo (NL); Leonard Josef Arnold Nielaba, Eygelshoven (NL)

(73) Assignee: DSM IP ASSETS B.V., Heerlen (NL)

( * ) Notice: Subject to any disclaimer, the term of this patent is extended or adjusted under 35 U.S.C. 154(b) by 154 days.

(21) Appl. No.: 15/371,100

(22) Filed: Dec. 6, 2016

(65) Prior Publication Data

US 2017/0082406 A1 Mar. 23, 2017

Related U.S. Application Data

(63) Continuation of application No. 12/740,490, filed as application No. PCT/EP2008/009121 on Oct. 29, 2008, now Pat. No. 9,541,351.

(Continued)

(30) Foreign Application Priority Data

Nov. 1, 2007 (EP) .................................... 07021357

(51) Int. Cl.
*F41H 5/04* (2006.01)
*B32B 5/02* (2006.01)
(Continued)

(52) U.S. Cl.
CPC ........... *F41H 5/0485* (2013.01); *B32B 5/022* (2013.01); *B32B 5/12* (2013.01); *B32B 37/10* (2013.01); *B32B 37/144* (2013.01); *B32B 37/16* (2013.01); *D03D 1/0052* (2013.01); *D04H 5/08* (2013.01); *F41H 5/0478* (2013.01); *B32B 2260/023* (2013.01); *B32B 2262/0253* (2013.01);
(Continued)

(58) Field of Classification Search
CPC ......... B32B 5/022; B32B 5/12; B32B 37/144; B32B 2571/02; B32B 2307/558; D03D 1/0052; Y10T 428/24132
See application file for complete search history.

(56) References Cited

U.S. PATENT DOCUMENTS 2,744,846 A 5/1956 Stickles
5,935,678 A 8/1999 Park
(Continued)

FOREIGN PATENT DOCUMENTS

EP 0 116 845 8/1984
EP 0 269 151 6/1988
(Continued)

OTHER PUBLICATIONS

International Search Report for PCT/EP2008/009121, dated Mar. 3, 2009.
(Continued)

*Primary Examiner* — Laura A Auer
(74) *Attorney, Agent, or Firm* — Nixon & Vanderhye, PC (57) ABSTRACT

Material sheets are provided which include at least one monolayer, wherein the at least one monolayer has a plurality of drawn unidirectional polymer fibers having a strength of greater than 1.2 GPa and a thickness of less than 100 μm, and wherein the material sheet includes a bonding agent of less than 13 wt % relative to the total weight of the material sheet.

23 Claims, 4 Drawing Sheets

Related U.S. Application Data (60) Provisional application No. 60/996,107, filed on Nov. 1, 2007.

(51) Int. Cl.
  *B32B 5/12* (2006.01)
  *B32B 37/10* (2006.01)
  *B32B 37/14* (2006.01)
  *B32B 37/16* (2006.01)
  *D03D 1/00* (2006.01)
  *D04H 5/08* (2012.01)

(52) U.S. Cl.
  CPC ..... *B32B 2307/558* (2013.01); *B32B 2323/04* (2013.01); *B32B 2571/02* (2013.01); *Y10T 428/24132* (2015.01)

(56) References Cited

U.S. PATENT DOCUMENTS

| | | |
|---|---|---|
| 6,893,704 B1 | 5/2005 | Van Der Loo |
| 2004/0113324 A1 | 6/2004 | Jones et al. |
| 2005/0153098 A1 | 7/2005 | Bhatnagar et al. |
| 2006/0210749 A1 | 9/2006 | Geva et al. |
| 2007/0194490 A1 | 8/2007 | Bhatnagar et al. |

FOREIGN PATENT DOCUMENTS

| | | |
|---|---|---|
| GB | 2 242 414 | 10/1991 |
| GB | 2 253 420 | 9/1992 |
| TW | 200621501 | 7/2006 |
| WO | 91/12136 | 8/1991 |
| WO | 01/73173 | 10/2001 |
| WO | 2005/066577 | 7/2005 |
| WO | 2007/107359 | 9/2007 |
| WO | 2007/122009 | 11/2007 |
| WO | 2007/122010 | 11/2007 |
| WO | 2009/056286 | 5/2009 |

OTHER PUBLICATIONS

EP Communication pursuant to Rule 114(2) EPC dated Apr. 18, 2012.

Hercules Incorporated, "Plastics Determination of Intrinsic Viscosity," Plastics Technical Center, Rev Apr. 29, 1982, pp. 1-21.

Figure 4

MATERIAL SHEET AND PROCESS FOR ITS PREPARATION

This application is a continuation of U.S. application Ser. No. 12/740,490, filed Apr. 29, 2010 (now U.S. Pat. No. 9,541,351), which is the national phase application of International Application PCT/EP2008/009121, filed Oct. 29, 2008, which designated the US and claims priority to European Patent Application No. 07021357.4, filed Nov. 1, 2007 and U.S. Provisional Application No. 60/996,107, filed Nov. 1, 2007, the entire contents of each of which are hereby incorporated by reference.

The invention relates to a material sheet comprising one or more unidirectional monolayers of drawn polymer, and to its process of preparation. The invention also relates to a ballistic resistant article comprising the material sheet.

The quest for increasing the anti-ballistic performance of high strength polymer fibers has involved the development of the processing of these fibers into material sheets.

EP 0116845 A2 discloses a process for the production of polyethylene articles, including multilayered material sheets, which involves the application of pressure and temperatures of between 100° C. to 160° C. to a network of fibers for sufficient time such that adjacent fibers adhere. The document disclosed that good anti-ballistic is obtainable, even when the precursor fibers are heated above their melting temperature. The application of evaluated pressure and/or time is applied to deform the fibers to substantially eliminate voids and thereby produce a film-like article. Embodiments relating to anti-ballistic materials include a multilayered material sheet (1 kg/m$^2$) comprising successive layers of unidirectional fibers draw at right angles and containing a HDPE film matrix resulted in $E_{abs}$ of less than 40 Jm$^2$/kg (22 caliber fragment projectiles). The highest $E_{abs}$ results were achieved when a pressure of 12.9 MPa was applied to 1 kg/m$^2$ plate comprising cross plied unidirectional aligned 1384 denier twisted fiber, with higher or lower pressures resulting in lower $E_{abs}$ values.

GB 2253420 discloses that improved anti-ballistic performance may be obtained through an improvement in the transverse properties of compacted multilayer fiber sheets. This is achieved through selectively melting a sufficient proportion of orientated fibers to improve the mechanical properties in the transverse direction to the aligned fibers. The pressure applied is not sufficiently high to inhibit the selective melting process, in which at least 5 wt % of the fibers are melted. After the completion of the selective melting stage, a higher pressure of typically 40 to 50 MPa is applied to produce a homogeneous product. The improved mechanical properties in the transverse direction are achieved at the expense of a reduction in mechanical properties in the direction of the aligned fibers.

Although the anti-ballistic performance of the multilayered material sheets described in EP 0116845 A2 and GB 2253420 is satisfactory, this performance can be improved further.

An object of the present invention is to provide a multilayered material sheet having improved anti-ballistic performance and, in particular, an improved energy absorbance value, Eabs.

This object is achieved with the present invention by providing a material sheet comprising at least one monolayer, wherein at least one monolayer comprises a plurality of drawn unidirectional polymer fibers having a strength of greater than 1.2 GPa, characterised in that the at least one monolayer has a thickness of less than 100 μm and the material sheet comprises a bonding agent of less than 13 wt % relative to the total weight of the material sheet.

Preferably, the material sheet consists of the one or more monolayers.

It has been surprisingly found that an improved anti-ballistic performance of the material sheet of unidirectional monolayers of drawn ultra high molecular weight polymer may be achieved through increasing the number of interfacial sites within the material sheet per given areal density, or thickness. The anti-ballistic performance is further improved through the combination of a thin monolayer with a relatively low level of bonding agent compared to the prior art, whether added, or formed in situ by partial melting or preferably by mechanical fusing of the drawn ultra high molecular weight polymer fibers.

The maximum thickness of the at least one monolayer is preferably less than 60, more preferably less than 50. Even more preferably the maximum thickness of the at least one monolayer is less than 45, more preferably less than 40 and most preferably less than 35 μm. This results in an even better anti-ballistic performance.

The minimum thickness of the at least one monolayers is preferably at least 5, more preferably at least 8, even more preferably at least 10 and most preferably at least 12 μm. The minimum thickness of the monolayer may be controlled through by the fiber diameter. Fiber, for the purposes of the present invention, means a monafilament or a filament in a multifilament yarn.

The higher the minimum thickness of the at least one monolayer, the better processability of the material sheets and the less expensive the material sheets are to produce.

The synergistic effect of combining a low proportion of bonding agent and high number of monolayers per given areal density is counter-intuitive given that a higher number of monolayers per given areal density is typically associated with increased proportions of bonding agent due to the increased total surface area which is required to be bonded together.

Preferably, the material sheet is substantially free of a bonding agent. Substantially fee of a bonding agent, within the context of the present invention means less than 5 wt % bonding agent whether formed in situ or added, relative to the total weight of the material sheet. More preferably there is less than 3 wt % of in situ bonding agent. Unless otherwise indicated, material sheet means the polymer fiber and the bonding agent.

The reduction or elimination of the bonding agent is advantageously achieved through mechanically fusing the fibers together, thereby forming an integral material sheet. Integral means in the context of this application the interconnecting of fibers.

The material sheet preferably comprises at least two monolayers, wherein at least one monolayer comprises a plurality of drawn unidirectional polymer fibers having a strength of greater than 1.2 GPa, characterised in that the at least one monolayer has a thickness of less than 100 μm, the material sheet comprises a bonding agent of less than 13 wt % relative to the total weight of the material sheet and wherein the fiber direction in adjacent monolayers in the material sheet differs by an angle α.

Although the angle α may be selected within wide ranges, angle α is preferably between 45 and 135°, more preferably between 65 and 115° and most preferably between 80 and 100°.

With unidirectional fibers is meant in the context of this application fibers, in a monolayer, that are mutually parallel aligned.

A monolayer according to the present invention may also be produced in the form of a tape. A tape for the purposes of the present invention means an elongated structure having an aspect ratio of cross-sectional width to height of greater than 5 and less than 10,000. Preferably, the tape is between 10 to 50 µm thick. Preferably, the tape is 1 to 250 mm wide, more preferably 2 to 200 mm wide and most preferably 5 to 150 mm wide.

The tape may be prepared from unidirectionally aligned and bonded, preferably mechanically fused, fibers. The tape may subsequently be used in woven structures or may be unidirectionally aligned to form a unidirectional sheet of tapes.

The material sheet has good anti-ballistic properties when adjacent fibers within the same monolayer are mechanically fused with a pressure of preferably at least 75 bar, more preferably 100 bar, more preferably mechanically fused with a pressure of at least 150 bar, even more preferably mechanically fused with a pressure of at least 200 bar. Most preferably adjacent fibers within the same monolayer are mechanically fused with a pressure of at least 300 bar. This results in an even better anti-ballistic performance of the material sheet.

This effect is unexpected, especially in the absence of an added bonding agent, given that the prior art teaches that the temperature of compacting or consolidating the fibers is the critical process parameter, with other parameters such as pressure and time not being limited to a required operational range. In addition, prior art teaches that to improve anti-ballistic performance a bonding matrix should be created to improve tensile strength in the transverse direction to the alignment of the fibers.

The mechanical fusing of the adjacent fibers within a monolayer, in the context of the present invention, means the bonding of the fibers together by high pressure, below the melting temperature of the fiber. While not wanting to be held to theory, it is thought that the mechanical fusing between adjacent fibers within the same monolayer is achieved through a combination of Van der Waals bonding and mechanical interlocking between the fibers, achievable by maintaining the adjacent fibers under intimate contact under the high pressures as previously described.

The temperature during mechanical fusing may vary over a wide range but preferably at least 5, more preferably at least 10, even more preferably at least 15, even more preferably at least 20, event more preferably at least 25 and most preferably at least 30° C. below the melting temperature of the drawn fibers. The lower the temperature is below the melting point of the polymer fiber, the lower the risk that melt bonding will occur, and hence a deterioration in the tensile strength of the fibers. Generally this temperature will not be chosen so low than an economically not viable process is obtained. Preferably the temperature during mechanical fusing is not lower than 60° C. below the melting temperature of the fiber, more preferably not lower than 50° C. below the melting temperature of the fiber. The skilled addressee will appreciate that the specific processing temperature will also be dependent upon the pressure and the compression time.

In the case of drawn ultra high molecular weight polyethylene, the process temperature may be between 100° C. to about 155° C., preferably between 110° C. and 155° C. and more preferably 115° C. and 150° C. and most preferably between 120° C. and 140° C.

The adjacent fibers within the same monolayer are preferably in intimate contact along their substantial length. Preferably, at least 80 wt %, 90 wt % or 95 wt % of the adjacent fibers within the same monolayer are mechanically fused together. Mechanical fusion is observed through the formation of an integral monolayer without the addition of a material that integrally connects all the fibers together along their substantial length (i.e. preferably at least 40, 60 or 80% of the length of the adjacent fibers) as seen by the eye, or by a (scanning electron) microscope. The use of mechanical fusion enables the bonding agent to be applied locally, typically in the transverse direction to the unidirectional fibers. Thus, the bonding agent preferably does not function as a matrix forming material, but as an initial monolayer stabiliser. As a result, the amount of bonding agent may be minimised thus increasing anti-ballistic performance.

Mechanical fusing is preferably achieved under a combination of pressure, temperature and time which results in substantially no melt bonding. Preferably, there is no detectable melt bonding as detected by DSC (10° C./min). No detectable melt bonding means that no visible endothermic effect consistent with partially melt recrystallised fibers is detected, when the sample is analysed in triplicate. It has been found the application of high pressures at a temperature suitably below the melting point of the fiber results in no detectable amount of melt recrystallised fibers being present, which is consistent with the substantial absence of melt bonding.

Melt bonding of adjacent fibers, within the context of the present invention, means the bonding of adjacent fibers through partial melting of the peripheral layers of adjacent fibers with the melt recrystallisation of partially melted peripheral layers forming an integral and bonding connection between the adjacent fibers. Melt bonding is detected through the measurement of melt recrystallised polymer fibers, as determined by DSC (10° C./min); partial melting within the context of the present invention means that greater than 0 wt % and less than 5 wt % of the fibers melted as measured by DSC (10° C./min). The formation of an integral material sheet in the absence of detectable melt bonding or the addition of a bonding agent is indicative of the presence of mechanical fused fibers.

In a special embodiment, the bonding agent also comprises partially melted fibers (i.e. an in situ bonding agent). Preferably, the total amount of bonding agent (added and in situ) is less than 18 wt %, more preferably less than 15 wt %, and evenmore preferably less than 13 wt %, 10 wt %, 9 wt %, 7 wt % 5 wt % and 3 wt % relative to the total weight of the material sheet. Preferably, the bonding agent is an in situ bonding agent.

The term bonding agent refers to a material that bonds, binds or holds the fibres together, such that the structure of the mono-layer is retained during handling and making of elements. The bonding agent can have been applied in various forms and ways; for example as a film, as transverse bonding strips or transverse fibres (transverse with respect to the unidirectional fibres), or by impregnating and/or embedding the fibres with a matrix material, e.g. with a polymer melt or a solution or dispersion of a polymeric material in a liquid.

In a preferred embodiment, the bonding agent is present as bonding strips or fibers which bond to the at least one monolayer and orientated in the transverse direction to the orientation of the fibers within the at least one monolayer. Preferably, the bonding strips or fibers covers no more than 20%, more preferably no more than 10% even more preferably no more than 5% and most preferably no more than 3% of the monolayer surface area the bonding strip is bonded to.

The elongation at break of the bonding agent is preferably greater than the elongation of the fibres. The bonding agent preferably has an elongation of 3 to 500%. Suitable thermosetting and thermoplastic polymer bonding agents are enumerated in, for example, WO 91/12136 A1 (pages 15-21). From the group of thermosetting polymers, vinyl esters, unsaturated polyesters, epoxides or phenol resins are preferably selected as matrix material. From the group of thermoplastic polymers, polyurethanes, polyvinyls, polyacrylics, polyolefins or thermoplastic elastomeric block copolymers such as polyisopropene-polyethylene-butylene-polystyrene or polystyrene-polyisoprene-polystyrene block copolymers can be selected as matrix material. Preferably the bonding agent consists essentially of a thermoplastic elastomer, which preferably substantially coats the individual filaments of said fibres in a monolayer, and has a tensile modulus (determined in accordance with ASTM D638 at 25° C.) of less than about 40 MPa. Such a bonding agent results in high flexibility of a mono-layer. Bonding agents used in localised applications across the monolayer preferably have a higher tensile modulus, preferably at least 100 MPa, more preferably at least 200 MPa.

The mechanical fusion which occurs, within the scope of the present invention, preferably also produces mechanical deformation which enables the topology each monolayer to be relatively flat such that there are substantially no voids between adjacent monolayers. Substantially no voids, within the meaning of the present invention means there is less than 5 volume % voids relative to the total volume of the monolayer or the material sheet, as determined by calculating the actual and theoretical density (based upon the weighed average density of the constituents, i.e. sum of [the fraction of each constituents of their density]) of the material sheet. Preferably, material sheet contains less than 3 or 1 volume % voids relative to the total volume of the material sheet.

In a preferred embodiment, the high pressures, as previously described, are applied to the plurality of fibers for at least 45 seconds, more preferably at least 1 minute or at least 5 minutes and most preferably at least 10 minutes. The contact time under high pressure is required to promote sufficient mechanical fusing between adjacent fibers, such that an integral material sheet is formed with a minimal content of bonding agent i.e. less than 13, 11, 10, 9, 7, 5 or 3 wt % compared to the total weight of the material sheet. The lower the bonding agent content, the higher the antiballistic performance of the material sheet.

In another aspect of the present invention, there is provided a process for the production a material sheet comprising the step of:
  a. unidirectionally aligning a plurality of drawn polymer fibers having a strength of greater than 1.2 GPa thereby forming a monolayer having a thickness of less than 100 µm and a bonding agent content of less than 13 wt % relative to the weight of the material sheet, and
  b. compressing the sheet, preferably at sufficiently high pressure to form an integral material sheet.

While individual monolayers may be advantageously used alone or in combination with other material, preferably the process is directed towards the formation of a multilayered material sheet.

In a preferred embodiment, the process further comprises the steps prior to step b. of repeating step (a) thereby producing at least two monolayers, and stacking each monolayer such that the fiber direction of each adjacent monolayers differs.

The amount of pressure which is required in step (b) will be dependent upon the thickness and number of monolayers within the material sheet. In embodiments in which the material sheet comprises 4 monolayers or less, then a pressure of preferably at least 50 bar may be sufficient. However, in embodiments in which the material sheet comprises a greater than 4 monolayers, then a pressure of at least 75 bar, more preferably at least 100 bar and even more preferably at least 150 bar is preferred.

In some embodiments, one or more monolayers may be temporarily consolidated, under a relatively low pressure (e.g. about 0.5 MPa or higher) such that the bonding agent stabilises the one of more monolayers for ease of handling and transport prior to permanently consolidating the monolayers to form an integral sheet as described in step (b).

Preferably, the drawn unidirectional polymer fibers in a monolayer are aligned such that at least a portion of the adjacent fibers, preferably at least 50% more preferably at least 70% and even more preferably at least 80% of the fibers, within at least one monolayer are in abutting contact along their substantial length (i.e at least 30%, preferably 50 and more preferably at least 70%) and the material sheet is compressed under at least 75 bar, preferably at least 100 bar pressure at a temperature, such that the abutting adjacent fibers are mechanically fused together, thereby forming an integral material sheet.

Preferably, the pressure and temperature that the material sheet is subjected to are selected, such that less than 5 wt % of the fibers within the material sheet have melted during the process as determined by DSC (10° C./min).

A particularly preferred embodiment of the material sheet according to the invention is characterized in that the drawn polymer fiber is made from a polymer selected from the group consisting of polyolefins, polyesters, polyvinyl alcohols, polyacrylonitriles, polyketones, polyamides, especially poly(p-phenylene teraphthalamide), liquid crystalline polymers and ladder-like polymers, such as polybenzimidazole or polybenzoxazole, especially poly(1,4-phenylene-2,6-benzobisoxazole), or poly(2,6-diimidazo[4,5-b-4',5'-e]pyridinylene-1,4-(2,5-dihydroxy)phenylene). Fibers from these polymers are preferably highly oriented by drawing the fibers at a suitable temperature.

In another preferred embodiment the drawn polymer fiber is based on a polymer selected from the group consisting of polyolefins, polyesters, polyvinyl alcohols, polyacrylonitriles, polyketones and polyamides.

In an even more preferred embodiment, the drawn polymer fiber is made from polyethylene, most preferably from ultra high molecular weight polyethylene (UHMWPE). The ultra high molecular weight polyethylene may be linear or branched, although preferably linear polyethylene is used. Linear polyethylene is herein understood to mean polyethylene with less than 1 side chain per 100 carbon atoms, and preferably with less than 1 side chain per 300 carbon atoms; a side chain or branch generally containing at least 10 carbon atoms. Side chains may suitably be measured by FTIR on a 2 mm thick compression moulded film, as mentioned in e.g. EP 0269151. The linear polyethylene may further contain up to 5 mol % of one or more other alkenes that are copolymerisable therewith, such as propene, butene, pentene, 4-methylpentene, octene. Preferably, the linear polyethylene is of high molar mass with an intrinsic viscosity (IV, as determined on solutions in decalin at 135° C.) of at least 4 dl/g; more preferably of at least 8 dl/g, most preferably of at least 10 dl/g. Such polyethylene is also referred to as ultra high molecular weight polyethylene. Intrinsic viscosity is a measure for molecular weight that can more easily be determined than actual molar mass parameters like Mn and Mw.

Preferably, the UHMWPE fibres consists of polyethylene filaments that have been prepared by a gel spinning process, such as described, for example, in GB 2042414 A or WO 01/73173 A1, are preferably used. A gel spinning process essentially consists of preparing a solution of a linear polyethylene with a high intrinsic viscosity, spinning the solution into filaments at a temperature above the dissolving temperature, cooling down the filaments to below the gelling temperature, such that gelling occurs, and stretching the filaments before, during and/or after the removal of the solvent. A UHMWPE material sheet of this type yields particularly good antiballistic properties.

Preferably, the strength of the drawn polymer fibers in a monolayer is at least 1.5, more preferably at least 2.0, even more preferably at least 2.5 and most preferably at least 3.0 GPa.

The invention also relates to ballistic resistant article comprising a material sheet according as previously defined and also to a woven ballistic resistant article comprising woven tape prepared or formed from the material sheet as previously described.

In a preferred embodiment, a material sheet is prepared through the unidirectional alignment of fibers to form a monolayer. This alignment of the fibers may be achieved through various standard techniques known in the art that is able to produce substantially straight rows of unidirectional fibers, such that adjacent fibers have substantially no gap between them. Preferably, the average thickness of such a monolayer is at 1.0, more preferably at least 1.3, 1.4 or 1.5 times the thickness of the individual fiber. This arrangement ensures that there is generally at least some overlap between adjacent fibers, such that the adjacent fibers may be mechanically fused under high pressure. Preferably, the maximum thickness of the monolayers is no more than 3, more preferably no more than 2.5, even more preferably no more than 2 and most preferably no more than 1.8 times the thickness of the individual fiber. Higher monolayer thickness tends to reduce anti-ballistic performance.

Figure 1:
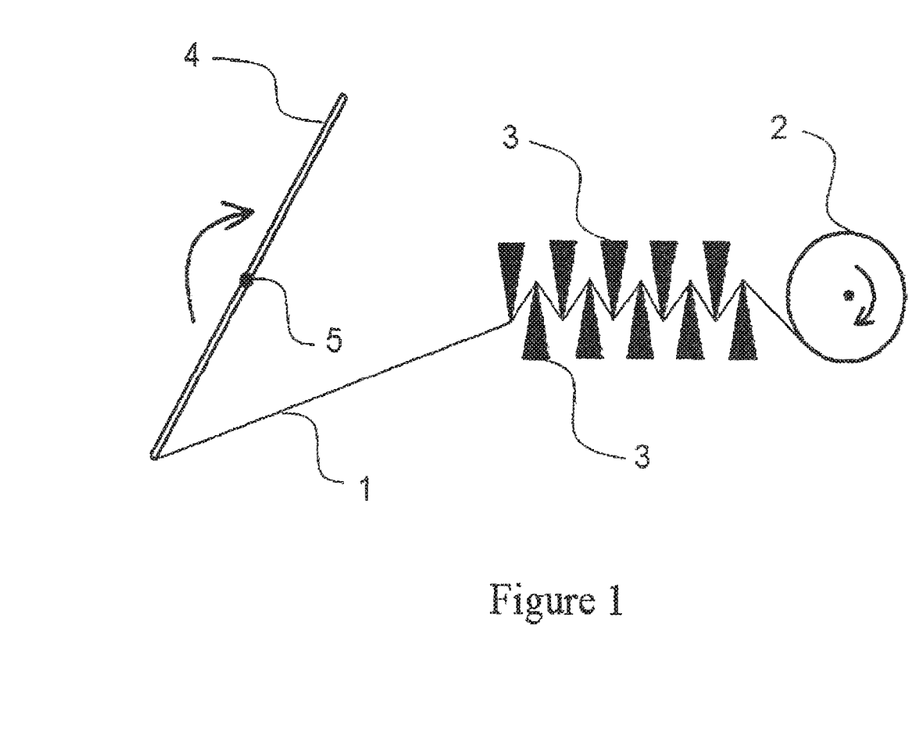
FIG. 1 is a schematic drawing of process in accordance with the present invention of preparing at least one monolayer.

The monolayer may suitably be formed by feeding a polymer fiber (1) from an unwinding station (2), under tension, through an alignment means, such as plurality of spreader bars (3) and onto a receiving device (4), such as plate as shown in FIG. 1.

The tension of the fibers is preferably no more than 25%, more preferably no more than 10% of the tensile strength of the fibers, as higher tension increases the risk of breaking the fibers in the spreader bars; the need for heavy duty processing equipment and a potential reduction in winding speeds. Too low a tension and the alignment of the fibers through the spreader bar and onto the receiving device is difficult to control.

The plate (4) rotates about a central axis (5) such that the fibers (1) working in cooperation with the spreader bars (3) create a monolayer of unidirectional fibers surrounding the circumference of the plate. In this case care should be taken that the alignment of the fibers is such that adjacent fibers are in longitudinal contact and are abutting each other.

Preferably, one layer of fibers is wound around the receiving plate, so to minimise the areal density of each monolayer.

The spreader bars are adjustable such that adjacent fibers are in close enough proximity for mechanical fusion of adjacent fibers to occur under high pressure once the required numbers of monolayers have been wound onto the receiving plate. Typically, the resultant mechanically fused adjacent fibers are fused along their substantial length (i.e. at least 30%, 40%, 50%, 60%, 70% relative to the total length of the adjacent fibers).

The radius of the tip of the spreader bar which contacts the polymer fiber is preferably at least 1 mm, as lower radii increase the risk of fiber breakage. Furthermore the radius of the tip of the spreader bar is preferably at most 20 mm, more preferably at most 10 mm.

The number of spreader bars is preferably between 6 and 20, with a good balance between speed and control achieved over this range.

After the completion of the first layer, the fiber end is fixated and the receiving plate may be rotated such that the winding of the second layer is at an angle to the preceding layer. The central axis preferably includes a clamp which may be removed and placed in alignment of the central axis of the second layer. Preferably, the receiving plate is of a rectangular configuration, such that the adjacent layers may be aligned at right angles to each other. Alternative configurations may also be used, such as various polygon configurations used depending upon the desired angles between adjacent monolayers of unidirectional fibers.

The process of winding further monolayers is preferably repeated until the desired number of monolayers per material sheet is achieved. Preferably, there is at least 2, 4, 6, 8 or 10 monolayers of drawn unidirectional polymer fibers per material sheet. The obtained material sheets may be stacked to form a stack comprising preferably at least 20, more preferably at least 40, even more preferably at least 60 and most preferably at least 80 stacked material sheets. The maximum number of material sheets will depend upon the ballistic threat and may suitably be determined by routine experiments. The consolidation of the stacked material sheets may be performed in an analogue fashion to the consolidation of the monolayers to form the material sheet.

The increasing number of monolayers favours hard antiballistic applications—whereby the stack of material sheets is further consolidated into a panel by pressing at a suitable temperature and pressure, while applications requiring flexibility, so called soft ballistics as e.g. a bullet resistant vest, use generally a lower number of material sheets.

In embodiments, in which the polymer of the drawn unidirectional polymer fiber is UHMWPE, the areal density of each monolayer is preferably less than 0.10 kg/m$^2$ and more preferably less than 0.08 kg/m$^2$, 0.06 kg/m$^2$, 0.05 kg/m$^2$ 0.045 kg/m$^2$, 0.04 kg/m$^2$ or 0.035 kg/m$^2$. The lower the areal density the greater the number of interfacial sites between adjacent layers per given areal density.

The receiving plate (4) in FIG. 1 is preferably loaded on both sides with at least one monolayer and is placed in a high pressure device and subjected to pressures of at least 100 bar The applied pressure is preferable applied in a one step process, with the pressure quickly (preferably within 30 seconds, more preferably within 20, 10 or 5 seconds) ramped up the target operating pressure to avoid melt bonding. As the time lag to change the temperature of the high pressure device is relatively long compared to the time lag to adjust pressure setting, the temperature is preferably maintained within the preferred temperature range (below the melting point of the fibers) for compression under high pressure.

The time for mechanical fusing is dependant upon the combination areal density of the sheet, temperature and pressure, but is typically at least 30 seconds and up to several hours. The optimum time for consolidation generally ranges from 5 to 120 minutes, depending on conditions such as temperature, pressure and part thickness and can be verified through routine experimentation. Preferably, the compression time has a lower range of at least 5, 10 or 15 minutes and an upper range of no more than 2, 1.5 or 1 hours.

After the completion of the mechanical fusing cycle, the product is cooled down to below 100° C., preferably while still maintaining the operating pressure. Pressure is preferably maintained at least until the temperature is sufficiently low to prevent relaxation, i.e. preferably below 80° C. Such temperature can be established by one skilled in the art. The plate is subsequently release from the high pressure device and the two consolidated stacks on either side of the plate obtained by cutting the fibers along the peripheral edge adjoining the two receiving plate surfaces.

Test methods as referred to in the present application, are as follows:

Intrinsic Viscosity (IV) is determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration;

Tensile properties (measured at 25° C.): tensile strength (or strength), tensile modulus (or modulus) and elongation at break (or eab) are defined and determined on multifilament yarns as specified in ASTM D885M, using a nominal gauge length of the fiber of 500 mm, a crosshead speed of 50%/min. On the basis of the measured stress-strain curve the modulus is determined as the gradient between 0.3 and 1% strain. For calculation of the modulus and strength, the tensile forces measured are divided by the titre, as determined by weighing 10 metres of fiber; values in GPa are calculated assuming a density of 0.97 g/cm$^3$. Tensile properties of thin films were measured in accordance with ISO 1184(H).

DSC is measured using a power-compensation PerkinElmer DSC-7 instrument which is calibrated with indium and tin with a heating rate of 10° C./min. For calibration (two point temperature calibration) of the DSC-7 instrument about 5 mg of indium and about 5 mg of tin are used, both weighed in at least two decimal places. Indium is used for both temperature and heat flow calibration; tin is used for temperature calibration only.

The furnace block of the DSC-7 is cooled with water, with a temperature of 4° C. This is done to provide a constant block temperature, resulting in more stable baselines and better sample temperature stability. The temperature of the furnace block should be stable for at least one hour before the start of the first analysis. The material sheet sample is taken such that a representative cross-sectional of adjoining peripheral fiber surfaces of adjacent fibers is achieved which may suitable be seen through light microscopy. The material sheet is cut into small pieces of 5 mm maximum and a sample size of at least about 1 mg (+/−0.1 mg) is taken. The represenative sample is put into an aluminum DSC sample pan (50 μl), which is covered with an aluminum lid (round side up) and then sealed. In the sample pan (or in the lid) a small hole must be perforated to avoid pressure build-up (leading to pan deformation and therefore worse thermal contact).

This sample pan is placed in a calibrated DSC-7 instrument. In the reference furnace an empty sample pan (covered with lid and sealed) is placed.

The following temperature program is run:
5 min. 40° C. (stabilization period)
40 up to 200° C. with 10° C./min. (first heating curve) 5 min. 200° C.
200 down to 40° C. (cooling curve) 5 min. 40° C.
40 up to 200° C. with 10° C./min. (second heating curve)

The same temperature program is run with an empty pan in the sample side of the DSC furnace (empty pan measurement).

Analysis of the first heating curve is used. The empty pan measurement is subtracted from the sample curve to correct for baseline curvature. Correction of the slope of the sample curve is performed by aligning the baseline at the flat part before and after the peaks (at 60 and 190° C. for UHMWPE). The peak height is the distance from the baseline to the top of the peak. Two endothermic peaks are expected for the first heating curve, in which case the peak heights of the two peaks are measured and the ratio of the peak heights determined.

For the calculation of the enthalpy of an endothermic peak transition prior to the main melting peak, it is assumed that this endothermic effect is superimposed on the main melting peak. The sigmoidal baseline is chosen to follow the curve of the main melting peak, the baseline is calculated by the PerkinElmer Pyris™ software by drawing tangents from the left and right limits of the peak transition. The calculated enthalpy is the peak area between the small endothermic peak transition and the sigmoidal baseline. To correlate the enthalpy to a weight %, a calibration curve is used.

EXAMPLES

Preparation of a Multilayered Material Sheet

A square aluminium receiving plate with a thickness of one cm and length and width of 41 cm was used to wind gel-spun high strength polyethylene fibers with a tenacity of 35.3 cN/dTex and a filament thickness of about 19 micron). The receiving plate was clamped in a rotating device, such that the fiber could be unwound under tension from a spool or the like. The fiber was guided over ten spreader bars and one layer was wound around the aluminium receiving plate.

The pitch of the windings may be set according to the desired areal density (AD)/thickness of the fiber layers. A minimum thickness of 30 μm was selected which corresponded to about 150% of the thickness of a single fiber to ensure adjacent fibers were is intimate contact (i.e. they were generally at least partially overlapping or abutting).

Three types of specimens, with different AD/thickness of the individual layers were made. The areal density of the total plate was also measured. After finishing the winding of one layer, the fiber end was fixated, the aluminium plate released from the clamps, rotated, and a new layer was wound with an angle of 90 degrees to the previous layer. This procedure was repeated, until the desired number of layers was reached, and the desired areal density of the stack of layers was obtained (Table 1).

The multi-layered material sheet, still bound to the receiving plate, was then inserted into a hydraulic press and subjected to 300 bar pressure at 138° C. for 1 hour, before being cooled to 80° C. under pressure. The hydraulic press was then opened and the product demoulded from the receiving plate. The fibers were cut along the edge of the aluminium plate to obtain two plates per cycle, which were trimmed to a width and length of about 40 cm and subjected to ballistic performance testing.

DSC analysis on the samples in the example detected no melt recrystallised fibers.

Ballistic Performance

Armoured plates produced from material sheets with cross plied monolayers of varying thickness (by stacking and pressing at 140° C., 300 bar during one hour, subsequently cooled under pressure to 80° C.) were subjected to shooting tests performed with 9 mm parabellum bullets full metal jacket round nose with nominal mass of 8 g (examples 1 to 5 and comparative experiment A). The first shot was fired at a projectile speed at which it is anticipated that 50% of the shots would be stopped ($V_{50}$ value). The actual bullet speed was measured at a short distance before impact. If a stop was obtained, the next shot was fired at an anticipated speed being 10% higher than the previous speed. If a perforation occurred, the next shot was fired at a speed being 10% lower than the previous speed. The result for the experimentally obtained $V_{50}$ value was the average of the two highest stops and the two lowest perforations. The kinetic energy of the bullet at $V_{50}$ was divided by the total areal density of the plate, thus reaching the so-called $E_{abs}$ value. $E_{abs}$ is a good performance parameter for armour plates, because it reflects the stopping power, relative to the weight/thickness of the plate.

TABLE 1

Ballistic performance versus areal density/thickness

| Example/Comp. Experiment # | thickness individual monolayer [μm] | areal density of armoured plate (AD) [kg/m$^2$] | $E_{abs}$ [J/(kg/m$^2$)] |
| --- | --- | --- | --- |
| 1 | 30 | 4 | Na perforation at obtainable bullet speed |
| 2 | 30 | 3 | 484 |
| 3 | 33 including 10% of bonding agent | 3 | 404 |
| 4 | 60 | 4 | 357 |
| 5 | 60 including 10% bonding agent | 2.9 | 302 |
| A | 100 | 4 | 258 |
| B | 260 including 20% bonding agent | 2.9 | 190 |

Example 5 and Comparative experiment B were performed upon plates subjected to 20 bar for 5 minutes and then 165 bar pressure at 145° C. for 60 minutes.

Figure 2:
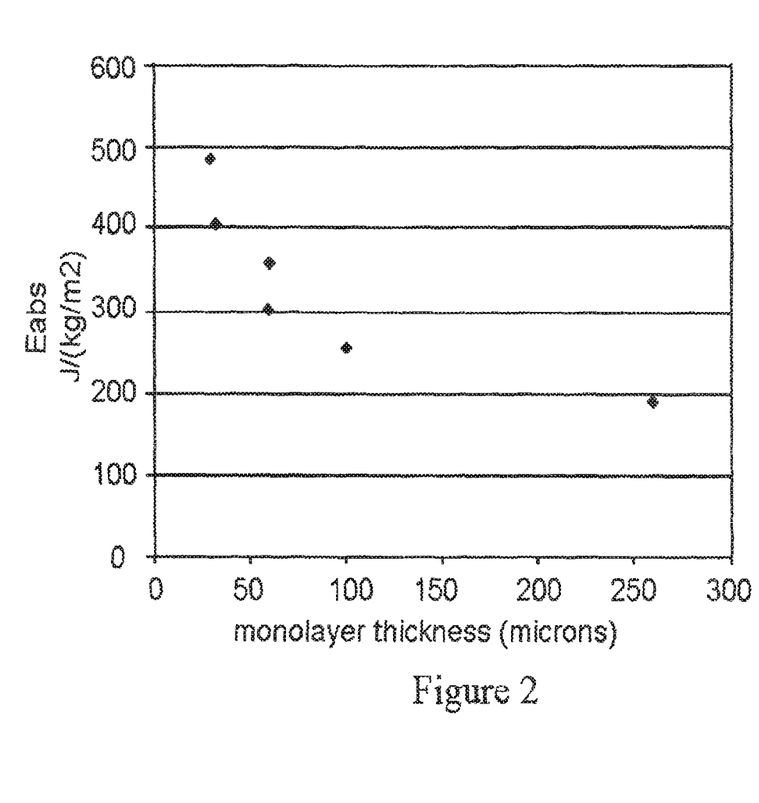
FIG. 2 is a graph illustrating ballistic performance versus monolayer thickness.

The results indicate that by increasing the number of monolayers in the armoured plate for a given areal density (i.e. decreasing thickness/areal density per monolayer), anti-ballistic performance is significantly improved. As illustrated in FIG. 2 (a graphic representation of Table 1), the increase in anti-ballistic performance accelerates when the monolayer thickness drops below 100 μm and particularly below 60 μm.

Retention of Mechanical Strength

The retention of mechanical strength in the longitudinal direction of the fibers was evaluated by subjecting individual fibers to high pressure conditions defined according to the present invention and comparing the tenacity of the fibers against the starting material. This was achieved through sandwiching test fibers within a multilayered construction.

The winding procedure, as previously described, was performed to create five monolayers from the earlier mentioned UHMWPE fiber, with a filament thickness of about 19 microns. Individual test fibers were then unilaterally aligned, in between layers of silicon paper. A further five layers of UHMWPE fiber were wound over the test fibers. The thickness of each layer was about 30 μm.

The tenacity of the fibers of 35.3 cN/dTex was measured prior to the mechanical fusing process.

TABLE 2

Tenacity (cN/dtex) of fibers versus processing conditions

| Example/Comparative Experiment | Pressing Step conditions | Tenacity cN/dtex |
| --- | --- | --- |
| 6 | 300 Bar, 131° C. | 33.2 |
| C | 10 Bar, 131° C. | 31.5 |
| D | 10 Bar, 144° C. | 30.6 |

As illustrated in Table 2, lower pressure and higher temperatures (Comparative experiment D) result in largest deterioration in tenacity (or tensile strength).

Figure 3:
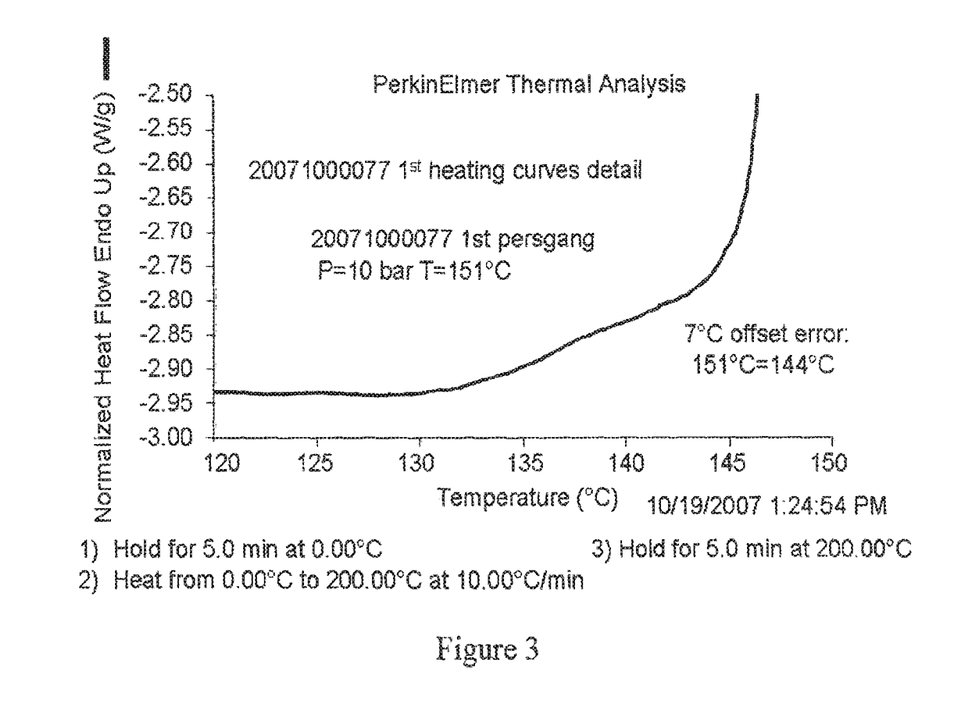
FIG. 3 is a Differential scanning calorimetry spectrograph illustrating the presence of an endothermic effect consistent with partial melt recrystallisation of the fibers.
Figure 4:
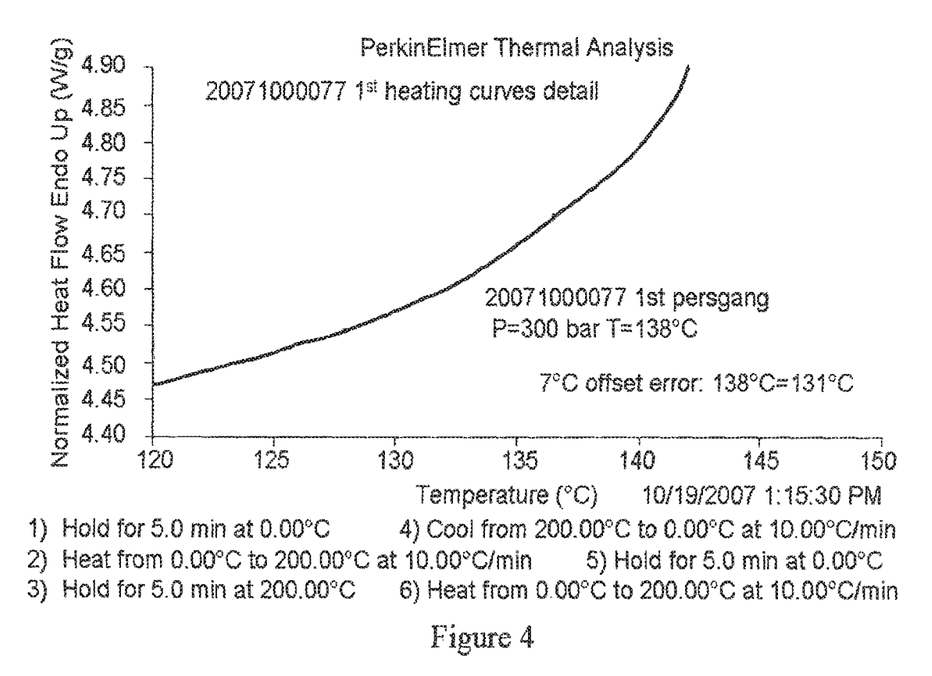
FIG. 4 is a Differential Scanning calorimetry spectrogram illustrating the absence of an endothermic effect consistent with the absence of melt recrystallisation of the fibers.

DSC analysis indicated that no detectable melt recrystallised polymer fibers were observed for Example 6. Comparative example C did exhibit signs of a visible endothermic effect in the DSC curve between 130° C. and 140° C. (around 131° C.) consistent with the presence of a small amount (i.e. <5 wt %) of partially melt recrystallised fibers (FIG. 3). In contrast this endotherm is absent in FIG. 4 for Example 6.

The results from Table 2 confirm that increasing mechanical fusing temperature decreases the tenacity of the fibers. As indicated in comparative example D, the combination of low pressure and an elevated temperature close to the melting point of the fiber results in partial melting of the fibers which contributes to the reduction in tenacity of the fibers. The application of an initial low pressure step was generally detrimental to the tenacity of the fibers. Thus, for the UHMWPE tested, mechanical fusing in a one step process using a combination of high pressure (e.g., at least 100 bar) and low temperature (e.g. less than 140° C.) achieved the optimal results.

The invention claimed is:
1. A material sheet comprising:
at least two monolayers, wherein
each of the at least two monolayers comprises a plurality of drawn unidirectionally aligned polymer fibers having a strength of greater than 1.2 GPa, and wherein
each of the at least two monolayers has a thickness of less than 100 μm, wherein
the material sheet comprises a bonding agent, wherein the bonding agent is present in an amount of less than 13 wt % relative to the total weight of the material sheet, wherein
adjacent fibers within each of the at least two monolayers are mechanically fused together in abutting lengthwise contact with one another to form an integral monolayer, and wherein in each of the at least two monolayers there is no detectable melt bonding as determined by DSC (10° C./min).

2. The material sheet of claim 1, wherein a fiber direction of the unidirectionally aligned polymer fibers in adjacent monolayers in the material sheet differs.

3. The material sheet of claim 1, wherein each of the at least two monolayers has a thickness of no more than 2 times the thickness of the drawn unidirectionally aligned polymer fibers.

4. The material sheet of claim 1, which comprises less than 10 wt % of the bonding agent.

5. The material sheet of claim 1, wherein the bonding agent is present as bonding strips or fibers to bond the fibers in a monolayer, wherein the bonding strips or fibers are orientated in a different direction than the unidirectionally aligned polymer fibers within the at least two monolayers.

6. The material sheet of claim 5, wherein the bonding strips or fibers cover no more than 20% of the monolayer surface area the bonding strip or fibers is bonded to.

7. The material sheet of claim 1 which is obtained by a process comprising the steps of:
   (a) unidirectionally aligning the plurality of drawn polymer fibers having a strength of greater than 1.2 GPa thereby forming a monolayer having a thickness of less than 100 μm and comprising a bonding agent, wherein the bonding agent is present in an amount of less than 13 wt % relative to the weight of the material sheet;
   (b) repeating step (a) thereby producing at least two monolayers;
   (c) forming a stack of monolayers by stacking the at least two monolayers such that a fiber direction of the unidirectionally aligned polymer fibers of each adjacent monolayer differs; and
   (d) compressing the stack of monolayers to form the material sheet.

8. The material sheet of claim 1, wherein each of the at least two monolayers has a topology which is flat, and wherein substantially no voids are presented between adjacent monolayers.

9. The material sheet of claim 1, wherein the adjacent fibers are mechanically fused along at least 40% of an abutting length thereof.

10. The material sheet of claim 1, wherein the adjacent fibers are mechanically fused along at least 60% of an abutting length thereof.

11. The material sheet of claim 1, wherein the adjacent fibers are mechanically fused along at least 80% of an abutting length thereof.

12. The material sheet of claim 1, wherein the adjacent fibers are mechanically fused along at least 90% of an abutting length thereof.

13. The material sheet of claim 1, wherein the adjacent fibers are mechanically fused along at least 95% of an abutting length thereof.

14. A tape comprising a plurality of drawn unidirectionally aligned polymer fibers having a strength of greater than 1.2 GPa, and comprising a bonding agent, wherein the tape has a thickness of less than 100 μm and that the bonding agent content is less than 13 wt % relative to the total weight of the tape, wherein adjacent fibers within the tape are mechanically fused together in abutting lengthwise contact with one another to form an integral tape, and wherein there is no detectable melt bonding as determined by DSC (10° C./min).

15. The tape of claim 14, wherein the adjacent fibers are mechanically fused along at least 40% of an abutting length thereof.

16. The tape of claim 14, wherein the adjacent fibers are mechanically fused along at least 60% of an abutting length thereof.

17. The tape of claim 14, wherein the adjacent fibers are mechanically fused along at least 80% of an abutting length thereof.

18. The tape of claim 14, wherein the adjacent fibers are mechanically fused along at least 90% of an abutting length thereof.

19. The tape of claim 14, wherein the adjacent fibers are mechanically fused along at least 95% of an abutting length thereof.

20. The tape of claim 14, which comprises less than 10 wt % of the bonding agent.

21. A ballistic resistant article comprising the material sheet according to claim 1.

22. A woven ballistic resistant article comprising the tape according to claim 14.

23. A ballistic resistant article comprising a tape according to claim 14.

* * * * *